United States Patent [19]

Kato et al.

[11] 4,377,120
[45] Mar. 22, 1983

[54] PATTERN SELECTION SYSTEM FOR A SEWING MACHINE

[75] Inventors: Masataka Kato; Nobuyasu Oshima, both of Nagoya, Japan

[73] Assignee: Brother Kogyo Kabushiki Kaisha, Nagoya, Japan

[21] Appl. No.: 256,400

[22] Filed: Apr. 22, 1981

[30] Foreign Application Priority Data

May 14, 1980 [JP] Japan .................. 55-63680

[51] Int. Cl.³ ............................................. D05B 3/02
[52] U.S. Cl. ............................................... 112/158 E
[58] Field of Search .......... 112/158 E, 158 F, 158 R, 112/121.11, 121.12; 340/782, 768, 752

[56] References Cited

U.S. PATENT DOCUMENTS

| 4,005,664 | 2/1977 | Garron | 112/158 E |
| 4,186,675 | 2/1980 | Yamashita et al. | 112/158 E X |
| 4,262,614 | 4/1981 | Sugaya et al. | 112/158 E |
| 4,275,674 | 6/1981 | Carbonato et al. | 112/158 E |
| 4,301,755 | 11/1981 | Kato et al. | 112/158 E |

Primary Examiner—Peter P. Nerbun
Attorney, Agent, or Firm—Browdy and Neimark

[57] ABSTRACT

A pattern selection system for a sewing machine capable of selectively forming a plurality of patterns is provided with at least two manual members for selecting a desired pattern out of a plurality of patterns. Those two manual members are arranged on the front side of the sewing machine for selecting one sequence of two predetermined pattern selection sequences, and for selecting one mode out of two predetermined selection modes such as selection speeds.

5 Claims, 4 Drawing Figures

PATTERN SELECTION SYSTEM FOR A SEWING MACHINE

BACKGROUND OF THE INVENTION

This invention relates to a pattern selection system, for use with a sewing machine, which is capable of selecting in a short time a desired one of a plurality of stitch patterns available on the machine.

Sewing machines available in recent years are provided with instrumentalities including a reciprocatory needle and capable of forming a succession of stitches placed in a selected one of multiple patterns, data generating means operating synchronously with reciprocation of said needle for generating stitch position data which regulates the positioning of each stitch in said selected pattern, and means for actuating said instrumentalities according to said stitch position data. This kind of sewing machine has come equipped with such arrangements and devices as to enable a single machine to efficiently execute an extensive range of sewing operations while keeping the operator's work load to the lowest possible level. Those arrangements and devices include an electronically controlled pattern selection system which has a capability of selecting any one of a plurality of different patterns through simple manipulation of switches.

There are some pattern selection system which are provided with selector switches each corresponding to respective one of different patterns. While such systems are useful and advantageous in that a desired pattern can be selected instantaneously, they are inevitably expensive. A pattern selection system, such as one disclosed in U.S. Pat. No. 4,005,664, wherein patterns may be selected in a predetermined sequence by an operation of a switch, is also available. Such a system is advantageous in being comparatively inexpensive, but not being free from time-consuming in the operation of pattern selection. Since the order for selecting patterns is only one, designating all of the patterns in sequence is sometimes required for selecting a desired one, which is said a serious weak point.

SUMMARY OF THE INVENTION

The object of this invention, which was made against such a background, is to provide an easy-to-operate, low cost pattern selection system which is capable of selecting in exact and efficient manner a desired one of a multiplicity of different predetermined patterns through use of at least two manually operated switches.

For achieving the above-mentioned object, a pattern selection system for a sewing machine in accordance with this invention comprises (a) pattern indicating means disposed on the front of the sewing machine and operative to selectively indicate a pattern out of the multiple patterns, (b) at least two manual members disposed closely to each other on the front of the sewing machine and manually operable to shift the pattern indication of the pattern indicating means in one of predetermined indication sequences reversed to one another, and (c) pattern selection controlling means for executing a series of functions according to the operational state of the manual members, wherein the series of functions includes a first function for selecting one of the two indication sequences, a second function for selecting one of the two indication shifting modes, and a third function for controlling the operation of the pattern indicating means so as to shift the pattern indication in the selected indication sequence and in the selected indication shifting mode and to finally indicate a selected pattern.

In this system the pattern selecting operation is, when a desired pattern is selected from a plurality of patterns, freely changeable in sequence and mode, for example, freely made in either the forward or backward shifting direction and at the same time at either the high or low speed level. This free switching of the selection sequence and mode can be easily executed by the operation of at least two closely located manual members, which enables the pattern selecting operation to be exactly performed in an extremely short time. It is quite effective in reducing the number of manual members arranged on the front of the sewing machine that each of the two manual members respectively possesses the two functions to designate the selection sequence and the selection mode. Provision of an easy-to-operate and low cost pattern selection system has thereby been realized.

DETAILED DESCRIPTION OF THE PREFERRED EMBODIMENTS

With reference to the appended drawings preferred embodiments of this invention will be described hereunder.

Figure 1:
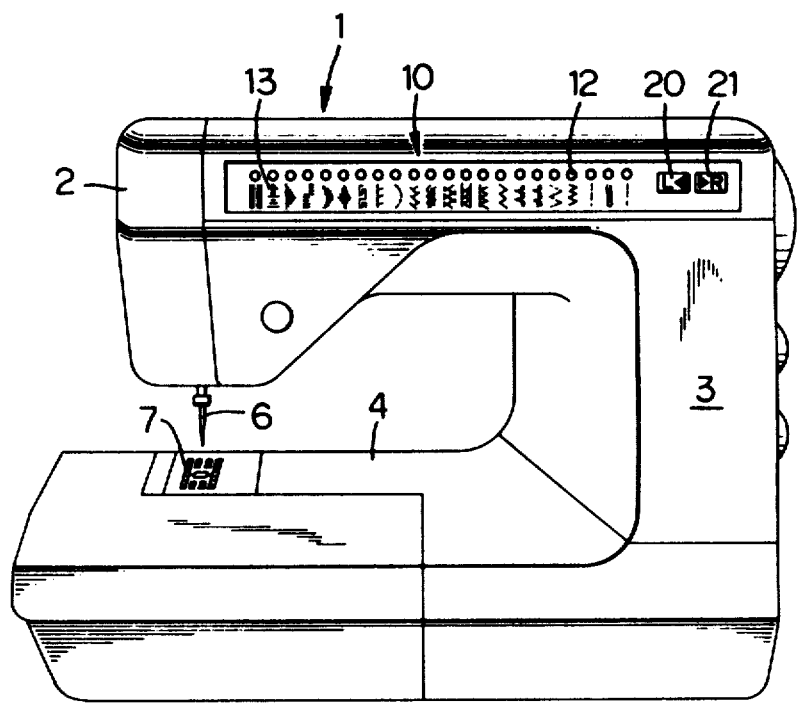
FIG. 1 is a perspective view of a sewing machine including a preferred embodiment of this invention.

There is illustrated in FIG. 1 a horizontally extending bracket arm 1 which is provided with at its both ends a head 2, a standard 3, respectively, the standard 3 being supported at its bottom portion by a work supporting bed 4.

On the front side of the bracket arm 1 a pattern indicating device 10 which is a display means for identifying or representing a plurality of different predetermined patterns is disposed. The pattern indicating device 10 includes a display panel 11 and a plurality of light emitting diodes 12, and on the former twenty-two pattern symbols 13 for respectively indicating an individual pattern are displayed. Each of the light emitting diodes (LED) 12 is disposed above the individual pattern symbols 13. An illuminated LED 12 designates a selected pattern for the sewing machine operator. On the front side of the bracket arm 1 are also provided two manual members, i.e., two manually operable push buttons 20 and 21 which are manipulated by the operator to select a desired pattern from among the plurality of different patterns.

Figure 2:
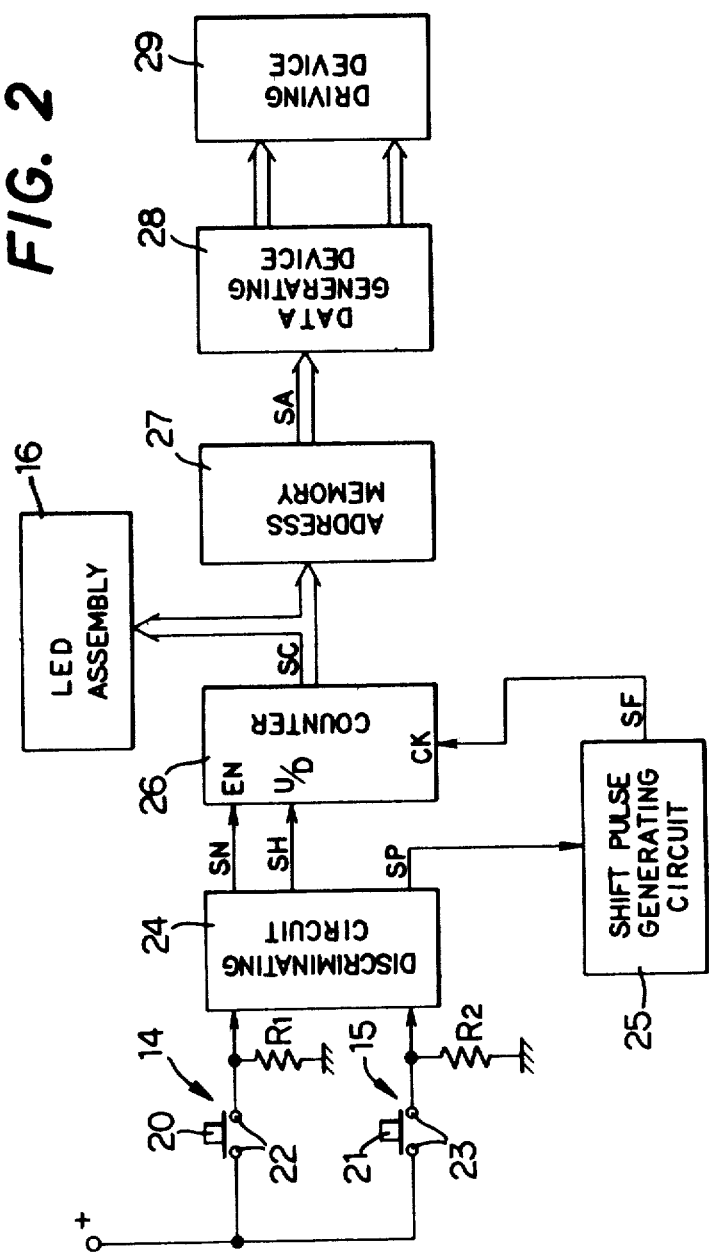
FIG. 2 is a block diagram showing arrangement of circuits of one preferred embodiment of the invention.

An electric circuit of this embodiment is composed, as shown in the block diagram of FIG. 2, of normal open switches 14, 15 having respectively a pair of contacts 22, 23, being inter-related or operatively associated with the push buttons 20, 21 as a manual member, a discriminating circuit 24, a shift pulse generating circuit 25, a counter 26 as a reversibly counting means, an LED assembly 16 including the LEDs 12 as light emitting elements, an address memory 27, a data generating device 28, and a driving device 29.

Each one contact of the switches 14, 15 are commonly connected to a plus power source and each of the other contact thereof are earthed through their respective resistor $R_1$, $R_2$ and also connected to the discriminating circuit 24, so that a "H" (high) level signal may be provided, while the push buttons are kept depressed, and a "L" (low) level signal may be provided, while they are not, to the discriminating circuit 24.

Figure 3:
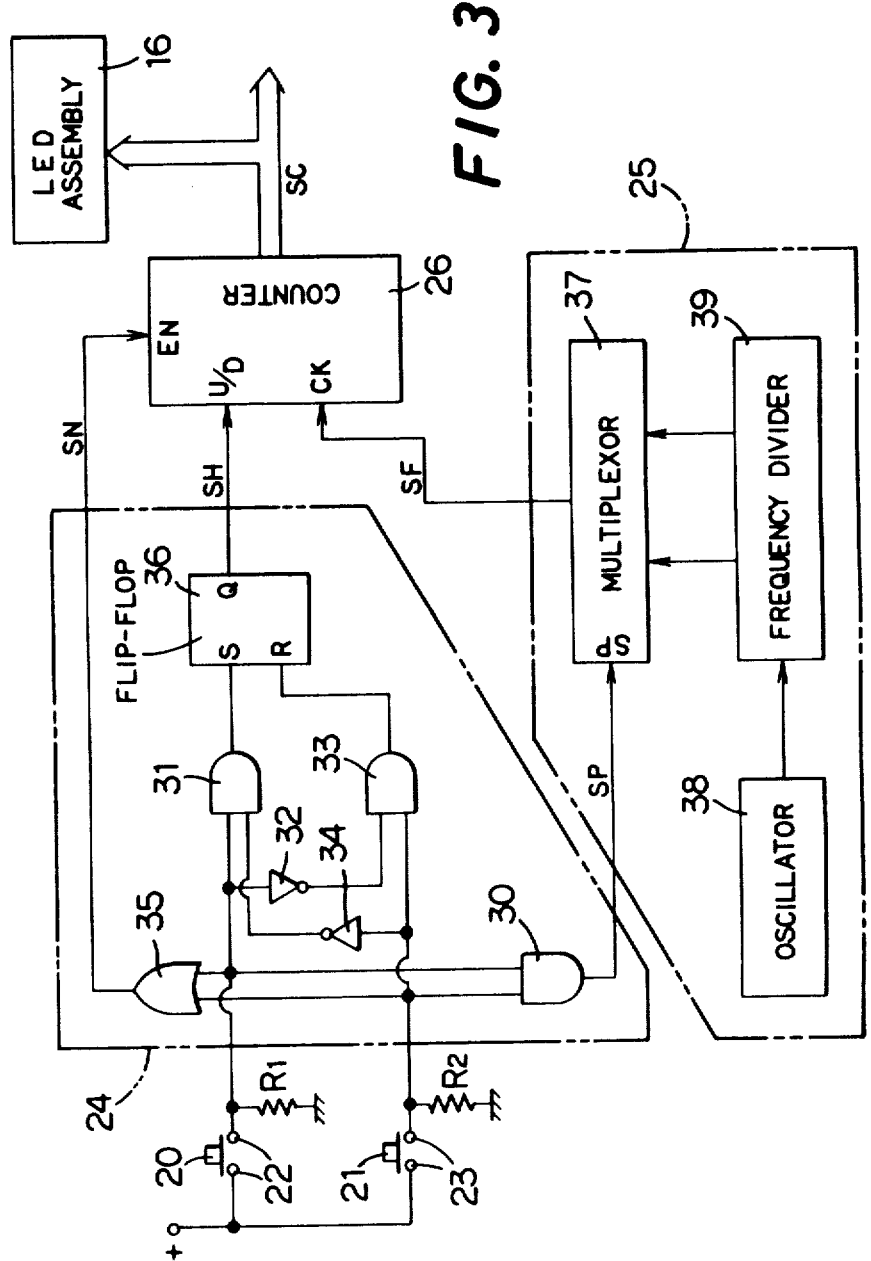
FIG. 3 is a circuit diagram illustrating an essential portion of the preferred embodiment shown in FIGS. 1 and 2.

As illustrated in FIG. 3, contacts 22 of the normal open switch 14 are connected to each input terminal of AND gates 30, 31, an inverter 32, and an OR gate 35, and contacts 23 of the normal open switch 15 are connected to each input terminal of AND gates 30, 33, an inverter 34, and an OR gate 35. Each output terminal of the inverters 32, 34 is respectively connected to the input terminal of the AND gates 33, 31. An output signal pulse SP from the AND gate 30 is generated when both of the push buttons 20, 21 are manually operated, and an output terminal of the AND gate 30 is connected to an input terminal SP of a multiplexor 37 in the shift pulse generating circuit 25 for selectively determining the pulse signal generation therefrom at either one state of the two predetermined ones. An output terminal of the AND gate 31 is, on the contrary, connected to an input terminal S of a flip-flop 36 of set-reset type, and an output terminal of the AND gate 33 is connected to an input terminal R of the flip-flop 36. An output signal pulse SN of the OR gate 35 is generated when either one of the push buttons 20, 21 is manually operated, and an output terminal thereof is connected to an input terminal EN of the counter 26 for rendering an input signal to be applied thereto effective.

Both input terminals of the flip-flop 36 of set-reset type are normally placed in a "L" level state. When a "H" level signal is applied to the input terminal R, an output terminal Q is reset to a "L" level state which is maintained until a "H" level signal is applied to the input terminal S. When the input terminal S is placed in a "H" level state, the output terminal Q is set to a "H" level state which is maintained until a "H" level signal is applied to the input terminal R. Thus, an output signal SH generated from the output terminal Q of the flip-flop 36 represents which one of the push buttons 20, 21 is depressed or activated earlier than the other, and the output terminal Q is connected to an input terminal U/D of the counter 26 for commanding the counter 26 whether it should move up or down one count in an adding or substracting direction.

In the shift pulse generating circuit 25, for the purpose of selecting one frequency of signal SF out of two predetermined ones so as to change pattern designation and supplying the signal SF of the selected frequency to the counter 26, an output terminal of an oscillator 38 is connected to an input terminal of a frequency divider 39, two output terminals of the frequency divider 39 are respectively connected to input terminals of the multiplexor 37, and an output terminal of the multiplexor 37 is connected to an input terminal CK of the counter 26. In other words, a signal generated from the oscillator 38 is declined within the frequency divider 39 for being divided into two signals of different frequency, high and low, and the multiplexor 37 selects either high or low frequency signal according to the signal SP from the AND gate 30 for supplying the signal SF of high frequency to the counter 26 when the signal SP applied is in "H" level.

The counter 26 which is of general type having a reversibly counting function counts signals to an input terminal CK, only when a "H" level signal is present at an input terminal EN, to perform an adding and subtracting operation in accordance with the state of a signal at the input terminal U/D. For the purpose of displaying the counted result and transferring a binary coded counting signal SC corresponding to a designated pattern the output terminal of the counter 26 is connected by way of leads to the LED assembly 16 and the address memory 27.

The LED assembly 16 includes a group of general purpose semi-conductor elements. When a counting signal SC is applied to a decoder of the LED assembly 16, the decoder feeds a signal current to and consequently illuminates one LED 12 that is correspondingly located to that input signal.

The address memory 27 is of well known structure and function for converting the counting signal SC into an address signal SA representing an address wherein initial data of a series of stitch data for forming a pattern is stored with a purpose of causing a later described data generating device 28 to generate stitch data for controlling the position of each stitch in a pattern corresponding to the counting signal SC. An output terminal of the address memory 27 is connected by way of leads to the data generating device 28.

The data generating device 28 is of well known structure and function for supplying sequentially stitch position data, viz., signals representative of needle and feed regulator positions, necessary to form a designated pattern to the driving device 29 in synchronization with vertical reciprocal movement of a needle 6 shown in FIG. 1. Two output terminals of the device 28 are connected by leads to a respective input terminal of the driving device 29.

The driving device 29 is a known drive unit which influences the lateral oscillating or jogging position of the needle 6 and the axis position of a feed regulator for adjusting the direction and magnitude of feed motion of a feed dog 7 (shown in FIG. 1) according to the above-mentioned stitch position data in order to form the specified pattern on the workpiece in cooperation with the vertical reciprocal movement of the needle 6 and the feed motion of the feed dog 7.

Now, the operation of this embodiment of the invention is discussed below:

While the push buttons 20 and 21 are not in the depressed position, all input signals to the discriminating circuit 24 are in a "L" level state because the normal open switches 14 and 15 related thereto are not in the closed position. Consequently, the signal levels at the output terminals of the AND gates 31 and 33 are "L", and the output signal SN of the OR gate 35 applied to the counter 26 is also "L", the input signal SF to the counter 26 being therefore ineffective to be counted. The counting signal SC is consequently maintained unchanged, giving rise to no positional change of the illuminated LED 12.

When the push button 20 is depressed and the switch 14 is closed, a "H" level signal is applied to the corresponding input terminal of the discriminating circuit 24, whereby a "H" level signal is presented from the AND gate 31, a "H" level signal SN is transferred from the OR gate 35 to the counter 26, rendering the same effective so as to enable the counter 26 to count the input signal SF thereto, and on the other hand the flip-flop 36 is set to produce a "H" level signal SH which is applied to the counter 26 to designate the counting operation therein in the adding direction. In the meantime, the multiplexor 37 provides a low frequency signal SF to the counter 26, because the output signal SP from the AND gate 30 is in a "L" level state and the counter 26, in response to that low frequency signal SF, performs the adding operation at a low speed, whereby the output signals SC from the counter 26 are gradually changed and the illumination of the LEDs 12 is slowly shifted to the left one after another while the push button 20 is kept in the depressed position. As soon as the push button 20 has been released of depression, the system is returned to the state wherein neither the push button 20 nor the push button 21 is in the depressed position, and thus the shifting of illumination of the LEDs 12 is immediately stopped and the currently designated or selected pattern is continuously indicated by the appropriate one of the pattern symbols 13.

If the push button 21 is additionally depressed while the push button 20 is kept depressed as described above, a "H" level output signal SP from the AND gate 30 is applied to the multiplexor 37 and hence a high frequency signal SF is supplied to the counter 26. As a result, the counter 26 operates at a high speed, causing its output signals SC to change fast and the illuminated LED 12 take turns in order quickly in the leftward direction. Upon releasing the push button 21, the system is restored to the state where only the push button 20 is in the depressed position and thus the illumination of the LEDs 12 is shifted from right to left at the original slow speed.

While the foregoing description of the operation of this embodiment is concerned with a leftward shifting of the illuminated LEDs 12, a rightward shifting of the same may be effected by first depressing the push button 21. In this case, a "H" level signal is applied to the input terminal R of the flip-flop 36, and the output signal SH thereof is reset to the "L" level state, thereby operating the counter 26 in the opposite direction, i.e., in the subtracting direction. The detailed description of the other aspects of the operation in the rightward shifting mode of the LEDs 12 is omitted as they are exactly the same as previously described. In summary, as long as the push button 21 is alone depressed the illuminated LED 12 is shifted to the right at a low speed and the rightward shifting speed is increased by depressing the push button 20 in addition to the already depressed push button 21, but the shifting motion is immediately stopped and a particular diode 12 is fixedly illuminated as soon as the push buttons 20 and 21 have both been released.

As explained above, the present embodiment of the pattern selection system may enjoy the use of two opposite directions and two different speeds, i.e., high and low, in and at which the illuminated LED 12 is shifted one after another, respectively, in selecting or designating a desired pattern representation, those choices being determined by way of considering a distance between the positions of a target pattern and a currently selected pattern represented by the particular LED which is illuminated upon starting the pattern selection, whereby a total length of time required for selecting a desired pattern may be easily reduced.

Another advantage of this embodiment resides in that the disposition of the push buttons 20 and 21 adjacent to each other on the front side of the sewing machine facilitates manipulation thereof with a single hand, and the same embodiment further presents an advantage that there is no need to provide a specially designed push button device or additional push buttons for changing or selecting speeds at which the illumination of the LEDs 12 is shifted one after another.

In addition, this embodiment is also advantageous in that only a single oscillator 38, which is high in cost, will suffice for generating two kinds of signals SF of different frequencies because of the use of the frequency divider 39 which is connected to the multiplexor 37 for such purpose.

Figure 4:
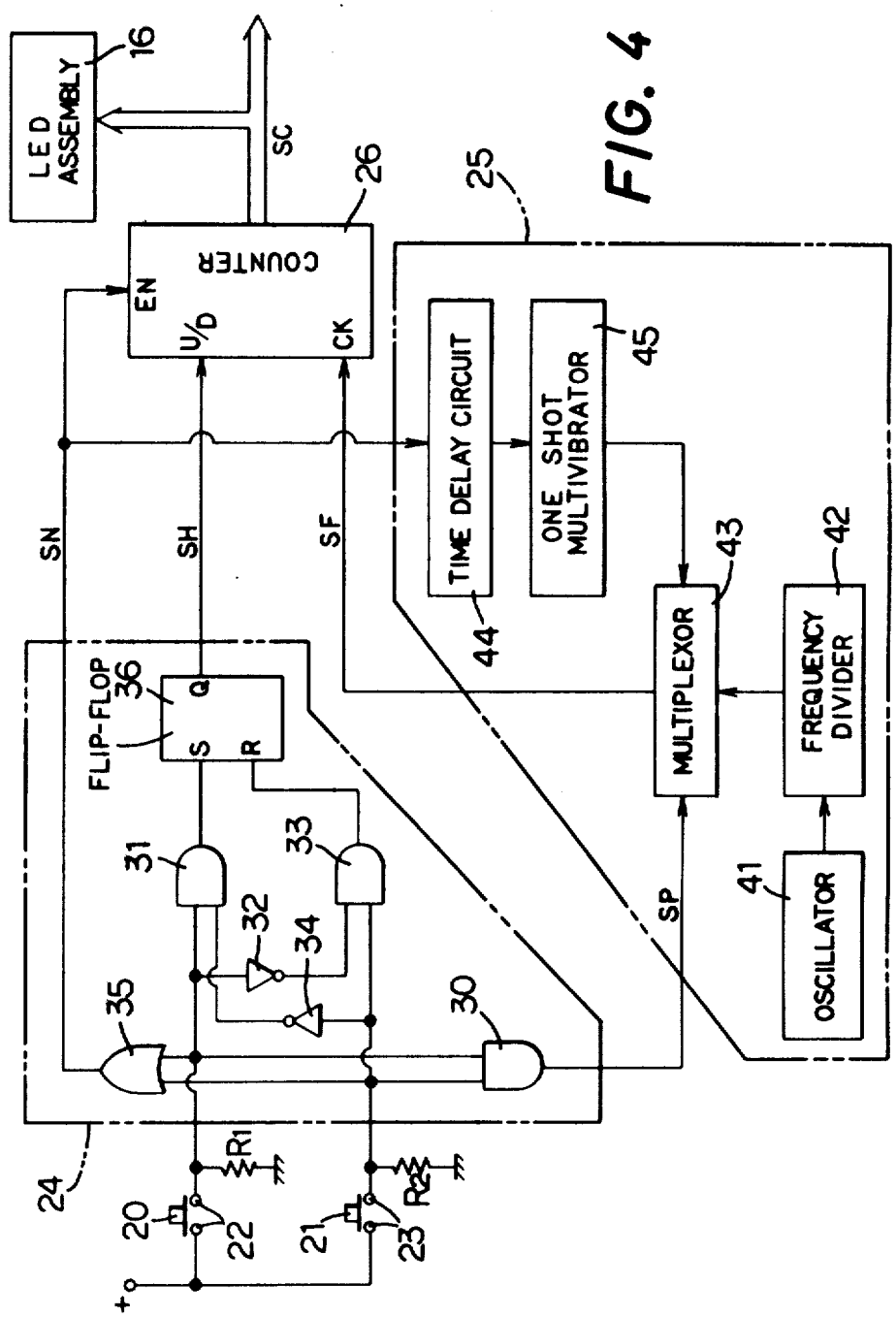
FIG. 4 is a circuit diagram, equivalent to FIG. 3, of another embodiment of the invention.

Referring now to FIG. 4, another embodiment of the present invention is hereunder disclosed. This embodiment is identical in arrangement to the previous embodiment except in the internal arrangement of the shift pulse generating circuit 25, and therefore the constructional description of this alternate embodiment other than that of its shift pulse generating circuit 25 is omitted herein.

The alternate shift pulse generating circuit 25 consists of an oscillator 41, a frequency divider 42, a multiplexor 43, a delay circuit 44 and a one shot multivibrator 45. The oscillator 41, similarly to the one used in the previous embodiment, generates a signal of a fixed frequency, the output terminal of which is connected to the input terminal of the frequency divider 42 which acts to convert the frequency signal applied to its input terminal into a signal of a declined frequency, the output terminal thereof being connected to an input terminal of the multiplexor 43. The delay circuit 44 and the one shot multivibrator 45 are connected in series between the output terminal of the OR gate 35 and the input terminal of the multiplexor 43 in order to delay the output signal SN from the OR gate 35 by a fixed length of time and supplies a resultant pulse signal to multiplexor 43.

The multiplexor 43 performs a function similar to that of the multiplexor 37 in the previous embodiment, the input terminal SP of which is connected to the output terminal of the AND gate 30 and the output terminal thereof to the input terminal CK of the counter 26 so as to provide the output signal from the frequency divider 42 when its input signal SP is in a "H" level state, and the output signal from the one shot multivibrator 35 when the signal S is in a "L" level state, both to the counter 26.

Hereunder is described the operation of this embodiment. While the push buttons 20 and 21 are not in the depressed position, the output signal from the OR gate 35 is in a "L" level state, and thus the input signal to the counter 26 is not counted as an effective signal and the counting signal SC from the output terminal of the counter 26 is unvarying, whereby the illumination position of the LED assembly 16 is fixed, i.e., a certain LED 12 is kept illuminated representing a particular pattern, as discussed with respect to the previous embodiment. When the push button 20 is depressed the normal open switch 14 is closed, and the input signal to the counter 26 is made effective while at the same time a counting direction, an adding operation in this instance, is designated in the same manner as in the previous embodiment. Since the output signal from the AND gate 30 is in a "L" level state at this time, the multiplexor 43 provides to the counter 26 an output signal of the one shot multivibrator 45 which is a pulse signal delayed for a certain time from the output signal SN of the OR gate 35, whereby the counter 26 stops after it has moved up one count and the illuminated LED is changed leftwardly to the next due to the output signal SC representing the content of the counter 26. In other words, the illumination of the LEDs 12 is shifted one position to the left each time the push button 20 is depressed.

If the push button 21 is additionally depressed while the push button 20 is in the depressed position as described above, a "H" level signal SP from the AND gate 30 is applied to the multiplexor 43 and therefore an output signal from the frequency divider 42 is transferred to the input terminal CK of the counter 26. As a result, the counter 26 is placed in a condition for moving up successive counts in accordance with the input signal SF and the illumination of the LEDs 12 is continuously shifted to the left one after another in response to the changing output signal SC from the counter 26. When the push button 21 is, or the push buttons 20 and 21 are, released, the input signal SF to the counter 26 stops, causing a fixation of illuminating a specified or particular LED 12.

While the above description of the operation refers to a leftward shifting of the illuminated LEDs 12, a rightward shifting of the same may be obtained by first depressing the push button 21. In this case, a "H" level signal is applied to the input terminal R of the flip-flop 36, the output signal SH is reset to the "L" level state and therefore the counter 26 operates in the opposite direction, that is in the subtracting direction. The other aspects of the rightward operation are exactly the same as the previously described leftward operation. In summary, the illumination of the LEDs 12 is shifted one position to the right each time the push button 21 is depressed. When the push button 20 is depressed in addition to the already depressed push button 21, the illumination of the LEDs 12 is continuously shifted to the right one after another, but the shifting motion is immediately stopped and a particular LED 12 is fixedly illuminated as soon as the push buttons 20 and 21 have both been released.

As indicated above, this alternate embodiment of the pattern selection system provides two modes of pattern selecting operation, i.e., shifting the illumination of the LEDs 12 one position at a time by each depression of the push button 20 or 21, or shifting the same continuously one position after another, such operation modes being chosen by giving consideration to a distance between the positions of a target pattern and a currently selected pattern represented by the particular LED 12 which is illuminated upon starting the pattern selecting operation, whereby a total length of time required for selecting a desired pattern may be easily reduced. Further advantages of this embodiment reside not only in elimination of the need for providing a specially designed push button device or other push buttons than the push buttons 20 and 21 for selection of patterns, but also in its internal arrangement wherein only a single oscillator 41 which is high in cost is required in the shift pulse generating circuit 25.

While preferred embodiments of the present invention have been described, such description is for illustrative purpose only, and it is to be understood that the invention is not limited thereto.

For example, in place of the pattern indicating device 10 including the display panel 11 and the LEDs 12 one displaying device wherein numerals or symbols corresponding to each pattern are utilized for sequentially changing what is displayed due to the depressing operation of the push button 20 or 21 is permissible.

Although the two embodiments described above are most preferable ones, this invention should be understood allowable to contain a pattern selecting device provided with a pair of manual members for selecting or deteriming an sequence of pattern indication and a particular manual member for selecting a mode of pattern indication.

It will be appreciated, for example, that the counter 26 of the preferred embodiments which is equipped with the input terminal EN may be replaced by a counter which has not the input terminal EN if there is provided at a stage preceding the input terminal CK an AND gate which is opened and closed by the output signal SN of the OR gate 35.

It will also be appreciated that the semi-conductor elements constituting a pattern selection system of the previously described preferred embodiments may be contained in one single semi-conductor element which has multiple functions partly or wholly. For example, the discriminating circuit 24, the shift pulse generating circuit 25, the counter 26, the address memory 27, and the data generating device 28 of the preferred embodiments may be incorporated in a so-called one-chip micro-computer. In this case, there is an advantage that the entire system may be smaller in size and less expensive.

What is claimed is:

1. A pattern selection system for a sewing machine having instrumentalities including a reciprocatory needle and capable of forming a succession of stitches placed in a selected one of multiple patterns, data generating means operating synchronously with reciprocation of said needle for generating stitch position data which regulates the positioning of each stitch in said selected pattern, and means for actuating said instrumentalities according to said stitch position data, comprising:

pattern indicating means disposing on the front of said machine and operative to selectively indicate a pattern out of said multiple patterns;

at least two manual members disposed closely to each other on the front of said machine and manually operable to shift the pattern indication of said pattern indicating means in one of two predetermined indication sequences reversed to one another; and pattern selection controlling means for executing a series of functions according to the operational state of said manual members, said series of functions including a first function for selecting one of said two indication sequences according to the operational order of said manual members, a second function for selecting one of two indication shifting modes, which are predetermined to shift said pattern indication at different time intervals, dependent upon operation of one or two of said manual members, and a third function for controlling the operation of said pattern indicating means so as to shift said pattern indication in said selected indication sequence and in said selected indication shifting mode and to finally indicate a selected pattern.

2. A pattern selection system as set forth in claim 1, wherein said pattern selection controlling means controls the operation of said pattern indicating means so as to shift said pattern indication at a constant long interval when one of said manual members is operated, and controls the operation of said pattern indicating means so as to shift said pattern indication at a constant short interval when two of said manual members are operated.

3. A pattern selection system as set forth in claim 1, wherein said pattern selection controlling means controls the operation of said pattern indicating means so as to shift one by one said pattern indication each time one of said manual members is operated and controls the operation of said pattern indicating means at a constant time interval as long as two of said manual members are operated.

4. A pattern selection system for a sewing machine having instrumentalities including a reciprocatory needle and capable of forming a succession of stitches placed in a selected one of multiple patterns, data generating means operating synchronously with reciprocation of said needle for generating stitch position data which regulates the positioning of each stitch in said selected pattern, and means for actuating said instrumentalities according to said stitch position data, comprising:

a pattern display panel disposed on the front of said machine and including multiple pattern symbols arranged in a row, each of said multiple pattern symbols representing one of said multiple patterns;

multiple light emitting elements, each of which corresponds to one of said multiple patterns and is operative to indicate said pattern symbol representing a pattern out of said multiple patterns;

at least two manual members disposed closely to each other on the front of said machine and manually operable to shift the indication of said pattern symbol in one of two predetermined indication shifting directions reversed to one another; and pattern selection controlling means for executing a series of functions according to the operational state of said manual members, said series of functions including a first function for selecting one of said two indication shifting directions according to the operational order of said manual members, a second function for selecting one of two indication shifting modes, which are predetermined to shift said pattern symbol indication at different time intervals, according as one or two of said manual members are operated, a third function for controlling the operation of said multiple light emitting elements so as to shift said pattern symbol indication in said selected indication shifting direction and in said selected indication shifting mode.

5. A pattern selection system for a sewing machine having instrumentalities including a reciprocatory needle and capable of forming a succession of stitches placed in a selected one of multiple patterns, data generating means operating synchronously with reciprocation of said needle for generating stitch position data which regulates the positioning of each stitch in said selected pattern, and means for actuating said instrumentalities according to said stitch position data, comprising:

pattern indicating means disposed on the front of said machine and operative to selectively indicate a pattern out of said multiple patterns;

at least two manual members disposed closely to each other on the front of said machine and manually operable to shift the pattern indication of said pattern indicating means in one of two predetermined indication sequences reversed to one another; and pattern selection controlling means for executing a series of functions according to the operational state of said manual members, said series of functions including a first function for selecting one of said two indication sequences; a second function for selecting one of two indication shifting modes, one mode being selected to shift said pattern indication at a constant long time interval when one of said manual members is operated, the other mode being selected to shift said pattern indication at a constant short time interval when two of said manual members are operated; and a third function for controlling the operation of said pattern indicating means so as to shift said pattern indication in said selected indication sequence and in said selected indication shifting mode and to finally indicate a selected pattern.

* * * * *